United States Patent [19]

Drexler

[11] Patent Number: 4,683,371

[45] Date of Patent: * Jul. 28, 1987

[54] DUAL STRIPE OPTICAL DATA CARD

[75] Inventor: Jerome Drexler, Los Altos Hills, Calif.

[73] Assignee: Drexler Technology Corporation, Mountain View, Calif.

[*] Notice: The portion of the term of this patent subsequent to Feb. 25, 2003 has been disclaimed.

[21] Appl. No.: 763,027

[22] Filed: Aug. 6, 1985

Related U.S. Application Data

[63] Continuation-in-part of Ser. No. 673,573, Nov. 21, 1984, Pat. No. 4,542,288, which is a continuation-in-part of Ser. No. 566,966, Dec. 29, 1983, Pat. No. 4,500,777, which is a continuation-in-part of Ser. No. 492,691, May 11, 1983, abandoned, which is a continuation-in-part of Ser. No. 238,833, Feb. 27, 1981, abandoned.

[51] Int. Cl.⁴ .............................................. G06K 19/00
[52] U.S. Cl. ...................................... 235/487; 235/454; 346/76 L; 350/3.61; 365/106
[58] Field of Search ............... 235/440, 454, 456, 468, 235/470, 487; 350/3.61; 346/76 L; 430/10, 13; 365/106

[56] References Cited

U.S. PATENT DOCUMENTS

| | | | |
|---|---|---|---|
| 3,530,441 | 9/1970 | Ovshinsky | 340/173 |
| 3,644,683 | 2/1972 | Braun | 346/76 L |
| 3,873,813 | 3/1975 | Lahr et al. | 235/61.12 N |
| 4,014,602 | 3/1977 | Ruell | 350/3.61 |
| 4,190,843 | 2/1980 | Spong | 346/1.1 |
| 4,197,986 | 4/1980 | Nagata | 235/379 |
| 4,202,491 | 5/1980 | Suzuki | 235/491 |
| 4,209,804 | 6/1980 | Dil | 358/128.5 |
| 4,224,666 | 9/1980 | Giraud | 364/200 |
| 4,300,143 | 11/1981 | Bell et al. | 346/135.1 |
| 4,304,990 | 12/1981 | Atalla | 235/380 |
| 4,305,081 | 12/1981 | Spong | 346/135.1 |
| 4,313,188 | 1/1982 | Bartolini et al. | 369/109 |
| 4,345,261 | 8/1982 | Wilkinson | 346/76 L |
| 4,360,728 | 11/1982 | Drexler | 235/462 |
| 4,425,570 | 1/1984 | Bell et al. | 346/135.1 |
| 4,467,209 | 8/1984 | Maurer et al. | 235/487 |
| 4,493,887 | 1/1985 | Peeters et al. | 430/275 |
| 4,527,173 | 7/1985 | Gupta et al. | 346/135.1 |
| 4,572,891 | 2/1986 | Drexler | 346/76 L |

*Primary Examiner*—David L. Trafton

[57] ABSTRACT

An optical data card having a pair of spaced apart information strips. One strip has pre-recorded programs or data and is always a non-erasable strip. This strip may be either a reflective direct-read-after-write non-erasable type or may be a read-only optical memory (ROOM) strip. Another strip serves as a temporary, scratchpad or cache memory and is either a reflective DRAW strip of the erasable type or a DRAW non-erasable strip which is at least partially blank, with sufficient space for temporary memory needs over an extended period of time.

4 Claims, 7 Drawing Figures

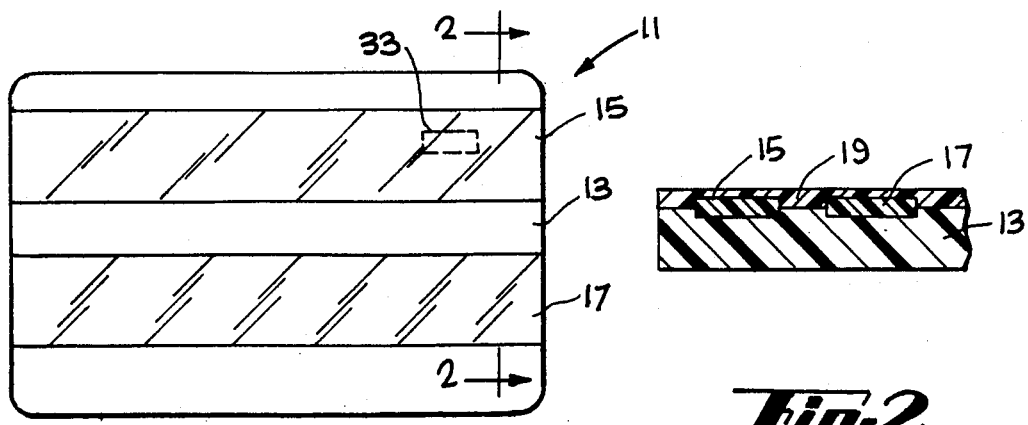
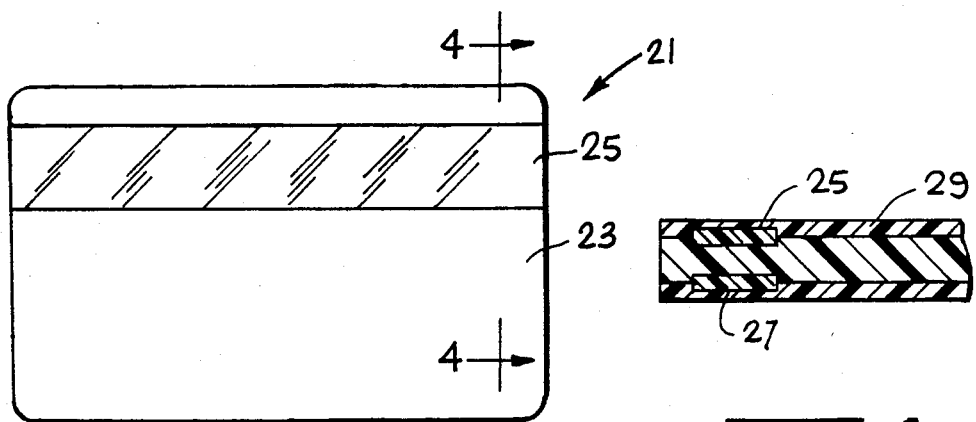
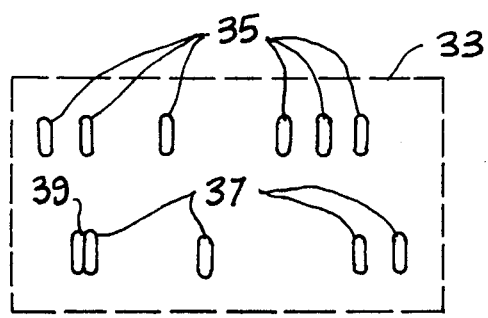

4,683,371

DUAL STRIPE OPTICAL DATA CARD

CROSS REFERENCE TO RELATED APPLICATION

This application is a continuation-in-part of prior application Ser. No. 673,573, filed Nov. 21, 1984, now U.S. Pat. 4,542,288, which is a continuation-in-part of prior application Ser. No. 566,966, filed Dec. 29, 1983, now U.S. Pat. No. 4,500,777, which was a continuation-in-part of prior application Ser. No. 492,691, filed May 11, 1983, now abandoned, which was a continuation-in-part of prior application Ser. No. 238,833, filed Feb. 27, 1981, now abandoned.

DESCRIPTION

1. Technical Field

The invention relates to optical information storage.

2. Background Art

In U.S. Pat. No. 4,360,728, Drexler describes a data card having a laser recording, direct-read-afterwrite (DRAW) stripe, alongside a magnetic stripe, the two stripes working in cooperation.

Maurer et al. in U.S. Pat. No. 4,467,209 discloses an identification card having erasable and non-erasable data. The erasable medium is suggested to be magnetic, while the non-erasable medium is a laser recording material or an integrated circuit Dil, in U.S. Pat. No. 4,209,804, teaches a reflective information recording structure which contains pre-pressed V-shaped grooves in which data may be recorded by local melting of the reflective metal coating by a laser. The data on the media is read by means of optical phase shift effects. Since the preformed grooves are at an optical phase depth of 95° to 140°, the reading laser must be of the precise wavelength corresponding to the groove depth. The information area has a width of approximately 0.6 microns, so a thick protective substrate, usually 1200 microns deep is used to ensure that one micron surface dust particles are out-of-focus for the read beam.

Such thick protective materials cannot be used for wallet cards which have a total thickness of only 800 microns under ISO (International Standards Organization) standards and further it would be uncomfortable to carry a rigid card in trouser pockets or wallets. Also, it is difficult to bond a phase sensitive recording/reading surface to a protective laminating material with an adhesive without introducing a varying phase shift across the surface. It is also impractical to melt large holes since a large lip would be formed around the hole causing a great distortion of the phase shift. Edge transition of the hole is the phase shift which is measured, and since the height of the lip is directly proportional to the square root of the hole diameter, phase shift reading is only practical for small holes. For example, a 25 micron diameter hole creates a lip with one micron height, which is much larger than the wavelength of the reading beam. Thus for large holes and bonded protective materials it is desirable to have a recording/reading structure that does not rely on phase shifts.

Lahr in U.S. Pat. No. 3,873,813 teaches a debit card in which use is indicated by alteration of a spot of heat sensitive coating in a selected area thereby permanently changing the reflective characteristics of that area. A reflective heat sensitive material becomes transparent on heating, thereby exposing an underlying strip of black paper which then absorbs the light energy. Recording requires exposure to a high intensity light beam for 0.7 second to raise the temperature of the material to 175° F. and an additional 5 milliseconds above 175° F. This type of credit card system permits recording of less than two data bits per second. Because of the retained, diffused liquid, the sizes of the data spots are large and difficult to regulate. This card requires a blue read beam, therefore scratches and surface dust will cause a large number of data errors unless very large data spots are used that reduce capacity to under 10,000 bits. While this data capacity is satisfactory for some debit and credit cards, it is unsuitable for detailed recording of financial, insurance, medical and personal records.

Nagata in U.S. Pat. No. 4,197,986, Girard in U.S. Pat. No. 4,224,666 and Atalla in U.S. Pat. No. 4,304,990 teach updating of data cards. Nagata teaches the updating of maximum limits and balance on a card in which the complete data file is in an auxiliary memory circuit such as a magnetic disc or drum. A sales slip containing the transaction is recorded separately from the card. Giraud teaches a data-processing machine-access card containing an integrated circuit chip with a memory bank. The memory stores predetermined items of confidential data intended to authorize or prevent access to the machine. Only the balance is updated.

Atalla teaches a card in which only the balance is recorded and updated. This card can only be used where the transaction system is connected to a central computer. None of these cards has the memory storage capacity needed to accumulate records of past transactions.

Gupta et al. in U.S. Pat. No. 4,527,173 teach an erasable, reusable recording medium having a heat-deformable optical recording layer with a transparent overcoat.

In U.S. Pat. No. 3,530,441, Ovshinsky teaches an erasable recording medium wherein amorphous silicon is locally converted to crystalline silicon with concomitant changes in optical reflectivity.

In U.S. Pat. No. 4,425,570 Bell et al. teach an erasable optical recording medium composed of a metallic granular material in a dielectric matrix. The metal particles are of a type which absorb light at the recording wavelength and reversably switch from an original state to a second state having different optical properties at a readout wavelength. An erasing light beam or heat is able to restore the material to its original condition.

Various recording media have been developed for use on a rotating disc format. Because the disc is spinning rapidly, short laser pulse times (on the order of 500 nanoseconds) are necessary to confine the heating to small spots. The media have been developed to increase the sensitivity to the beam by varying the parameter of media absorptivity. Spong in U.S. Pat. Nos. 4,190,843 and 4,305,081 puts an absorptive dye layer over a reflective aluminum layer. Spots are recorded by ablation of the dye layer exposing the underlying reflective layer. Bell in U.S. Pat. No. 4,300,143, teaches a similar technique. Bartolini in U.S. Pat. No. 4,313,188 adds a protective layer between the dye layer and the reflective layer. Wilkinson in U.S. Pat. No. 4,345,261 uses a light absorptive silica dielectric layer in place of the dye layer. Terao teaches an inorganic absorptive layer over an organic recording film layer. Holes are formed in the film layer by heat generated in the absorptive layer. Suzuki in U.S. Pat. No. 4,202,491 uses a fluorescent ink layer on which data spots emit infrared radiation. Magneto-optical erasable laser recording materials are also known in the art. For example, see U.S. Pat. No. 4,493,887 to Peeters et al. Improved sensitivity is obtained in these media at the expense of extra layers which increase complexity and cost. This increased sensitivity is not necessary for a card format.

DISCLOSURE OF INVENTION

It is the object of the present invention to devise a wallet-size plastic data card containing two optical data strips and a system for sequential recording transaction data on the data card with a laser where the data on the card optically contrasts with the surrounding unrecorded field. It is also an object of the invention to perform related sequential laser recording of transactions and events related to the fields of insurance, personal medical records, personal information, banking and related data records.

It is a further object of the invention to devise a wallet-size card, containing a laser recordable strip, that meets the ISO dimensions for plastic credit cards, has a capacity of at least 250,000 bits, can record data at thousands of bits per second and contains prerecorded information such as reference position on the strip.

The above objects have been met with an optically read, reflective data card having one media portion with pre-recorded programs or data and another media portion being in-situ recordable and substantially blank.

In accord with the present invention the media portion having pre-recorded programs or data is always a non-erasable strip. This strip may be either a reflective DRAW strip of the non-erasable type or may be a read-only optical memory (ROOM) strip. On the other hand, the media portion serving as the temporary, scratchpad or cache memory is either a reflective DRAW strip of the erasable type or a DRAW non-erasable strip which is at least partially blank, with sufficient space for temporary memory needs over an extended period of time.

One of the chief advantages of the present invention is the high information capacity of laser recording media strips, either of the erasable or nonerasable type. By using a pre-recorded strip for permanent data and an in-situ recordable strip for temporary storage, a single card provides for computational and data base needs. Typically, high resolution laser recording materials record spots of altered reflectivity optically contrasting with the surrounding reflective field and having dimensions less than 25 microns. A high capacity laser recording material strip enables a financial data card or other types of data cards to carry the equivalent of scores of pages of text, more than ample for most applications. The transaction card of the present invention is suitable for accumulating sequentially recorded data involving financial transactions, insurance transactions, medical information and events, and personal information and identification.

BRIEF DESCRIPTION OF DRAWINGS

FIG. 1 is a plan view of one side of a data card in accord with the present invention.

FIG. 2 is a partial side sectional view taken along lines 2—2 in FIG. 1.

FIG. 3 is a plan view of one side of an alternate embodiment of a data card in accord with the present invention.

FIG. 4 is a partial side sectional view taken along lines 4—4 in FIG. 3.

FIG. 5 is a detail of laser writing on a portion of the laser recording strip illustrated by dashed lines in FIG. 1.

BEST MODE FOR CARRYING OUT THE INVENTION

Figure 6:
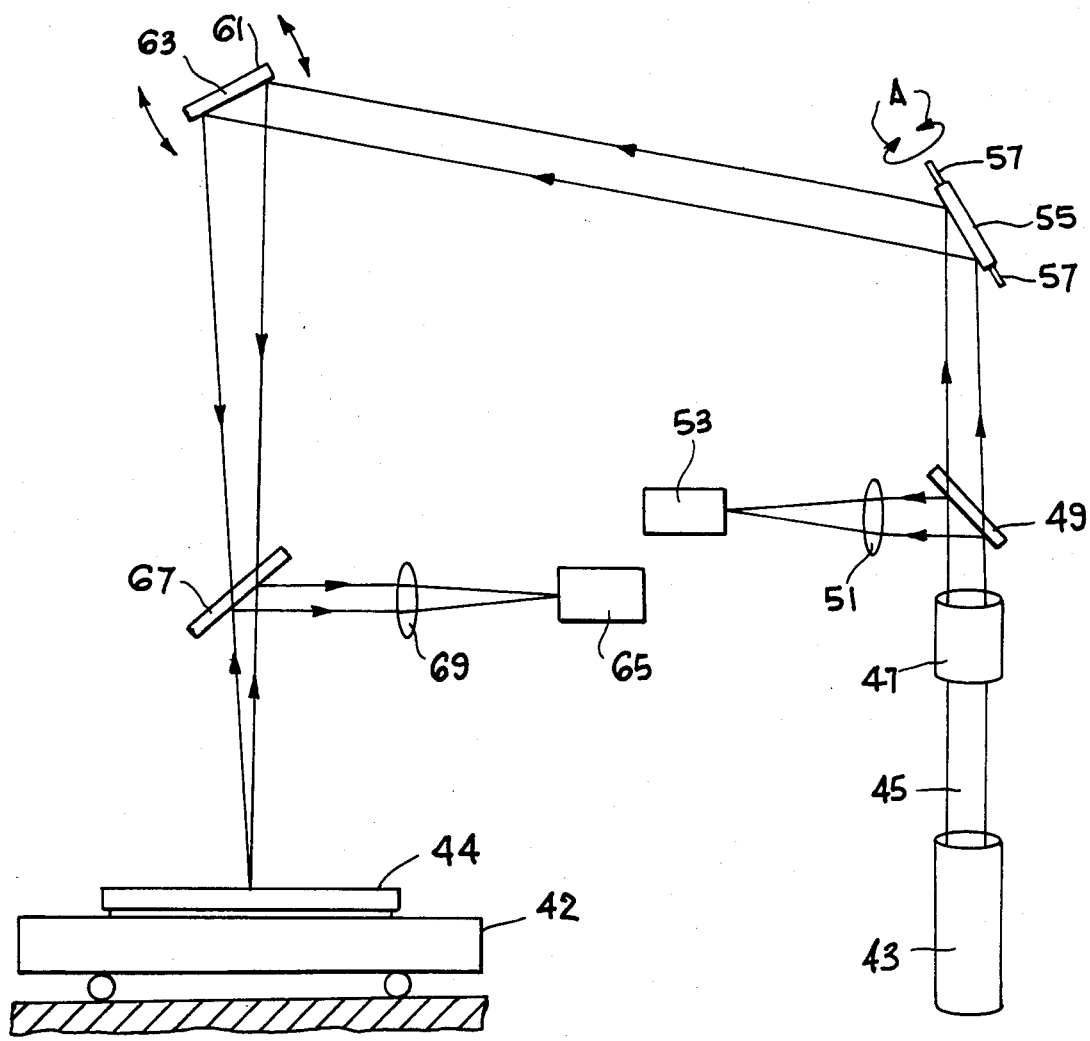
FIG. 6 is a plan view of an apparatus for reading and writing on the optical recording media strip illustrated in FIG. 1.

With reference to FIGS. 1 and 2, a data card 11 is illustrated having a size common to most credit cards. The width dimension of such a card is approximately 54 mm and the length dimension is approximately 85 mm. These dimensions are not critical, but preferred because such a size easily fits into a wallet and has historically been adopted as a convenient size for automatic teller machines and the like. The card's base 13 is a dielectric, usually a plastic material such as polyvinyl chloride or similar material. Polycarbonate plastic is preferred. The surface finish of the base should have low specular reflectivity, preferably less than 10%. Base 13 carries strip 15. The strip is about 15 millimeters wide and extends the length of the card. Alternatively, the strip may have other sizes and orientations. The strip is relatively thin, approximately 100–500 microns, although this is not critical. The strip may be applied to the card by any convenient method which achieves flatness. The strip is adhered to the card with an adhesive and covered by a transparent laminating sheet 19 which serves to keep strip 15 flat, as well as protecting the strip from dust and scratches. Sheet 19 is a thin, transparent plastic sheet laminating material or a coating, such as a transparent lacquer. The material is preferably made of polycarbonate plastic.

The opposite side of base 13 may have user identification indicia embossed on the surface of the card. Other indicia such as card expiration data, card number and the like may be optionally provided.

The high resolution laser recording material which forms strip 15 may be any of the reflective recording material which have been developed for use as direct read-after-write (DRAW) optical disks, so long as the materials can be formed on thin substrates. An advantage of reflective materials over transmissive materials is that the read/write equipment is all on one side of the card and automatic focus is easier. For example, the high resolution material described in U.S. Pat. No. 4,230,939 issued to de Bont, et al. teaches a thin metallic recording layer of reflective metals such as Bi, Te, Ind, Sn, Cu, Al, Pt, Au, Rh, As, Sb, Ge, Se, Ga. Materials which are preferred are those having high reflectivity and low melting point, particularly Cd, Sn, Tl, Ind, Bi and amalgams. Suspensions of reflective metal particles in organic colloids also form low melting temperature laser recording media. Silver is one such metal. Typical recording media are described in U.S. Pat. Nos. 4,314,260, 4,298,684, 4,278,758, 4,278,758, 4,278,756 and 4,269,917, all assigned to the assignee of the present invention. The laser recording material which is selected should be compatible with the laser which is used for writing on it. Some materials are more sensitive than others at certain wavelengths. Good sensitivity to infrared light is preferred because infrared is affected least by scratches and dirt on the transparent laminating sheet. The selected recording material should have a favorable signal-to-noise ratio and form high contrast data bits with the read/write system with which it is used. The material should not lose data when subjected to temperatures of about 122° F. (50° C.) for long periods. The material should also be capable of recording at speeds of at least several thousand bits/sec. This generally precludes the use of materials that require long heating times or that rely on slow chemical reactions in the presence of heat, which may permit recording of only a few bits/sec. A large number of highly reflective laser recording materials have been used for optical data disk applications. Data is recorded by forming spots in the surrounding field of the reflective layer itself, thereby altering the reflectivity in the data spot. Data is read by detecting the optical reflective contrast between the surrounding reflective field of unrecorded areas and the recorded spots. Spot reflectivity of less than half the reflectivity of the surrounding field produces a contrast ratio of at least two to one, which is sufficient contrast for reading. Greater contrast is preferred. Reflectivity of the strip field of about 50% is preferred with reflectivity of a spot in the reflective field being less than 10%, thus creating a contrast ratio of greater than five to one. Another laser recording material eis Drexon material, a trademark of Drexler Technology Corporation. The material is similar to that described in U.S. Pat. No. 4,284,716, assigned to the assignee of the present invention. While Drexon material is non-erasable, other reflective DRAW materials, which are erasable, may be used. An example of an erasable DRAW material is shown in U.S. Pat. No. 4,527,173 to Gupta et al., incorporated by reference herein. Also, Magnetooptical and amorphous to crystalline phase change erasable DRAW later recording materials have been known in the art for a decade. Alternatively, data may also be recorded by increasing the reflectivity of the strip. For example, the recording laser can melt a field of dull microscopic spikes on the strip to create flat shiny spots. This method is described in SPIE, Vol. 329, Optical Disk Technology (1982), p. 202. A spot reflectivity of more than twice the surrounding spiked field reflectivity produces a contrast ratio of at least two to one, which is sufficient contrast for reading.

An important consideration is that the first strip 15 be in-situ laser recordable. This same requirement is not applicable, although permissible, for the second strip 17, having similar dimensions to first strip 15 and parallel thereto. The second strip is optical data storage media and may be read-only-optical-media (ROOM) of the type made in accord with U.S. Pat. No. 4,304,848 to E. Bouldin and J. Drexler, assigned to the assignee of the present invention. The important consideration for the second optical data strip 17 is that it contain pre-recorded programs or data thereon. Such a strip should be able to record spots down to about 10 microns or smaller in size. The second strip may also be Drexon material, or material similar to the first strip as long as it contains pre-recorded programs or data.

The purpose of the first strip is to act as temporary data storage. The first strip is always a DRAW reflective strip, but may be erasable or non-erasable. A non-erasable strip must have adequate storage capacity for continuing to record temporary data. At the end of its useful life, the card is expendable. On the other hand, if the reflective DRAW strip is an erasable material, it may be reused upon erasing. While the first strip would generally not include a large percentage of pre-recorded material, it may contain some pre-recorded material, such as tracking information, so long as there is sufficient room on the card for lasr recording of user data.

EXAMPLE 1

The first strip may be a DRAW erasable strip, while the second strip may be a DRAW non-erasable strip having pre-recorded programs or data. The erasable strip could be made in accord with U.S. Pat. No. 4,527,173 while the non-erasable strip could be Drexon material.

EXAMPLE 2

The first strip could be a DRAW erasable strip, as in Example 1, but the second strip is a read-only-optical-memory strip having pre-recorded programs or data.

EXAMPLE 3

The first strip could be a non-erasable strip, such as Drexon material, while the second strip is a read-only-optical-memory strip, as in Example 2, having pre-recorded data and programs.

EXAMPLE 4

The first strip could be a DRAW erasable strip, having some pre-recorded information, but having room for temporary storage. The second strip is a read-only-optical-memory strip having pre-recorded information.

In each example, the first strip has room for temporary storage of intermediate results which may or may not be permanently written. The second strip has permanent programs and data, such as database information which may be acted upon by a computer to create the temporary storage information placed on the first strip.

With reference to FIGS. 3 and 4, a card 21 is shown, having a plastic base 23, similar to base 13 in FIG. 1. The card 21 has opposed first and second strips 25 and 27 adhered thereto with transparent laminating sheet 29 covering the base, as well as the strip 25, holding it securely in place. The card of FIGS. 3 and 4 is essentially the same as the card of FIGS. 1 and 2 except for the manner in which the two strips are arranged. In FIG. 1, the strips are on the same side of the card so that all reading and writing transducers can be located on the same side of the card, while in FIG. 3, optical transducers must be located on opposite sides of the card for reading and writing thereon.

With reference to FIG. 5, a magnified view of laser writing on the laser recording material strip 15 may be seen. The dashed line 33, corresponds to the dashed line 33 in FIG. 1. The oblong spots 35 are aligned in a path and have generally similar dimensions. The spots are generally circular or oval in shape with the axis of the oval perpendicular to the lengthwise dimension of the strip. A second group of spots 37 is shown aligned in a second path. The spots 37 have similar dimensions to the spots 35. The spacing between paths is not critical, except that the optics of the readback system should be able to easily distinguish between paths.

Presently, in optical disk technology, tracks which are separated by only a few microns may be resolved. The spacing and pattern of the spots along each path is selected for easy decoding. For example, oval spots of the type shown can be clustered and spaced in accord with self-clocking bar codes. If variations in the dimensions of a spot are required, such dimensions can be achieved by clustering spots, such as the double spot 39. Such variations are used in the ETAB bar code which is described in U.S. Pat. No. 4,245,152. While the American Banker's Association has not yet adopted any particular code, the strip material is such that many machine and eye readable codes can be accommodated. Some optical codes such as the Universal Product Code are both machine and eye readable. Such codes could also be accommodated, although a great deal more laser writing would be required than with circular or oval spots, and a much lower information density would be achieved. The spots illustrated in FIG. 5 typically have recommended sizes of approximately 5 microns by 20 microns, or 2 microns by 8 microns or circular spots 3 microns or 10 microns in diameter. Generally, the smallest dimension of a spot should be less than 50 microns. In the preferred embodiment the largest dimension would also be less than 50 microns. Of course, to offset lower densities from larger spots, the size of the strip 15 could be expanded to the point where it covers a large extent of the card. In FIG. 1, the laser recording strip 15 could completely cover a single side of the card. A minimum information capacity of 250,000 bits is indicated and a storage capacity of over one million bits is preferable.

In FIG. 6, a side view of the lengthwise dimension of a card 41 is shown. The card is usually received in a movable holder 42 which brings the card into the beam trajectory. A laser light source 43, preferably a pulsed semiconductor laser of near infrared wavelength emits a beam 45 which passes through collimating and focusing optics 47. The beam is sampled by a beam splitter 49 which transmits a portion of the beam through a focusing lens 51 to a photodetector 53. The detector 53 confirms laser writing and is not essential. The beam is then directed to a first servo controlled mirror 55 which is mounted for rotation along the axis 57 in the direction indicated by the arrows A. The purpose of the mirror 55 is to find the lateral edges of the laser recording material in a coarse mode of operation and then in a fine mode of operation identify data paths which exist predetermined distances from the edges.

Figure 7:
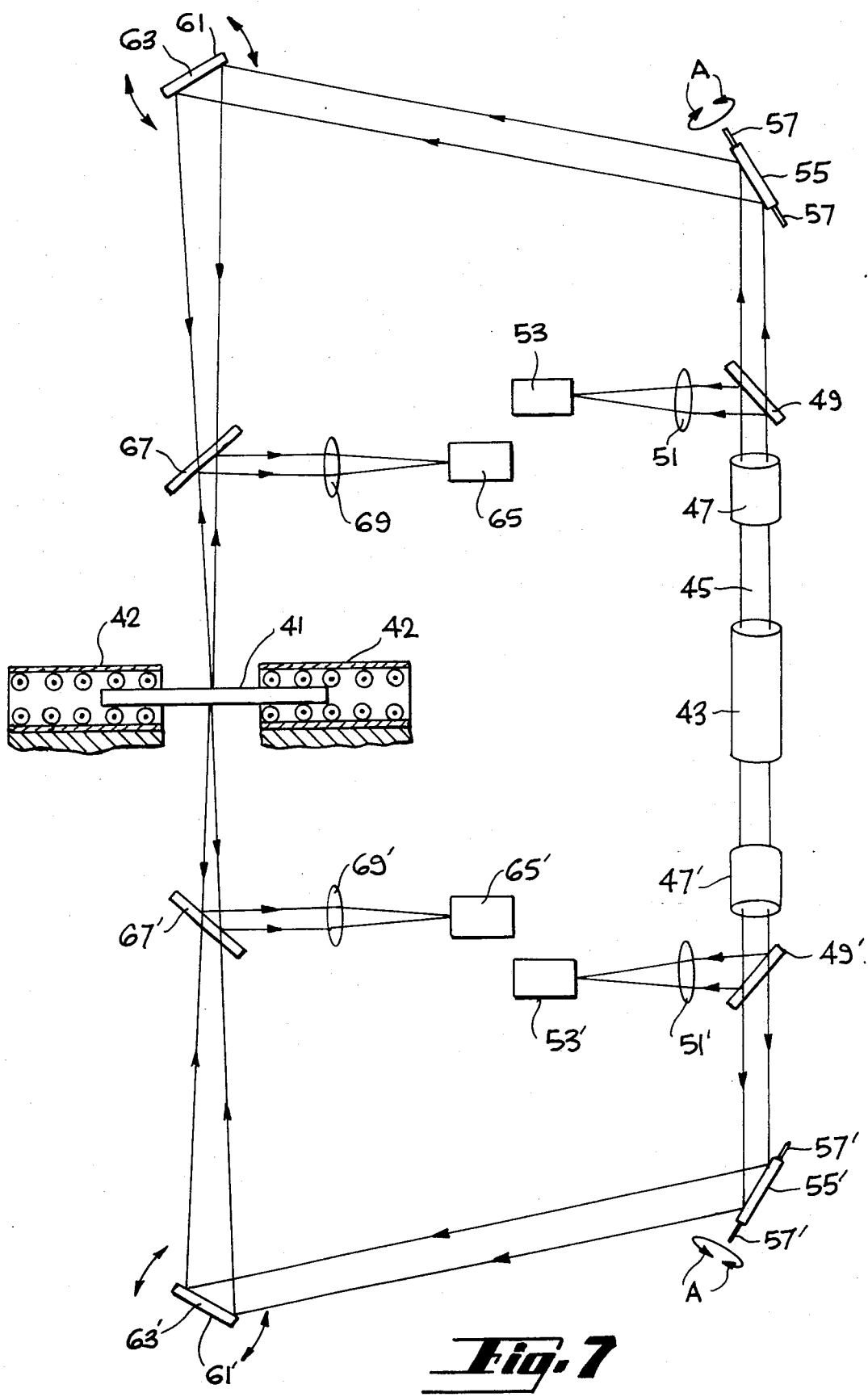
FIG. 7 is a plan view of an apparatus for reading and writing on the optical recording media strip illustrated in FIG. 3.

From mirror 55, the beam is directed toward mirror 61. This mirror is mounted for rotation at pivot 63. The purpose of mirror 55 is for fine control of motion of the beam along the length of the card. Coarse control of the lengthwise position of the card relative to the beam is achieved by motion of movable holder 42. In FIG. 7, a mirror image optical system may be used to read the back side of a card. A laser light source 43' emits a beam 45', passing through collimating and focusing optics 47'. Optical components 49', 51', 53', 55', 57', 59', 61', 63', 65', 67', 69' all correspond in function and performance to the unprimed components of the same number. The method of support of the card in FIG. 7 is slightly different since it is not possible to use a carriage 52. Support is shown by means of idlers 42' which allow the card to be supported on both sides and moved by rotation of the idlers which are driven in synchronism by a belt or wheel.

The position of the holder may be established by a linear motor adjusted by a closed loop position servo system of the type used in magnetic disk drives. During its manufacture one strip of the card is pre-recorded with a preinscribed pattern containing servo tracks, timing marks, program instructions, and related functions, while the other strip may have pre-recorded portions, but must have room for user laser writing. The positioning marks can be used as a reference for the laser recording system to record or read data at particular locations. Each of the various industries, that is, financial, insurance, medical, and personal, has formats specific to its particular needs. Formatting may be done using laser recording or surface molding of the servo tracks, having marks, programming and related functions. Dil, in U.S. Pat. No. 4,209,804 teaches a type of surface molding. Reference position information may be pre-recorded on the card so that position error signals may be generated and used as feedback in motor control. Upon reading one data path, the mirror 55 is slightly rotated. The motor moves holder 41 lengthwise so that the path can be read, and so on. Light scattered and reflected from the spots contrasts with the surrounding field where no spots exist. The beam should deliver sufficient laser pulse energy to the surface of the recording material to create spots. Typically, 5–20 milliwatts is required, depending on the recording material. A 20 milliwatt semiconductor laser, focussed to a five micron beam size, records at temperatures of about 200° C. and is capable of creating spots in less than 25 microseconds. The wavelength of the laser should be compatible with the recording material. In the read mode, power is lowered to about 5% of the record power.

Optical contrast between a spot and surrounding field are detected by light detector 65 which may be a photodiode. Light is focussed onto detector 65 by beam splitter 67 and focusing lens 69. Servo motors, not shown, control the positions of the mirrors and drive the mirrors in accord with instructions received from control circuits, as well as from feedback devices. The detector 65 produces electrical signals corresponding to spots. These signals are processed and recorded for subsequent display as useful information regarding the transaction recorded on the card.

In operation, the card of the present invention is used to record sequentially accumulated data, as medical records, insurance records, personal information, or financial transactions using a strip with pre-recorded information. For example, it could be used just like a passbook. First the card is read to determine previously recorded information. Next, a user enters his transaction on a financial transaction or medical information recorder. Such recorder then causes data to be written on the first strip by means of the laser. The data represents a passbook entry with a new account status. A computer may use the temporary storage strip to record intermediate computations or data. Operating in this mode, a user may use the card of the present invention in free standing financial transactions or medical information machines in isolated locations.

What is claimed is:

1. An optical data card comprising,
  a card substrate having opposed sides and a length equal to or exceeding a width,
  a first strip of erasable optical recording material affixed to said card substrate, said first strip being in-situ laser recordable and being substantially blank, and
  a second strip of optical data storage material affixed to said card substrate, said second strip having pre-recorded programs or data thereon.

2. The data card of claim 1 wherein said first strip comprises a direct-read-after-write, reflective, erasable strip and said second strip comprises a direct-read-after-write, reflective non-erasable strip.

3. The data card of claim 1 wherein said first strip comprises a direct-read-after-write, reflective, erasable strip and said second strip comprises a read-only optical memory.

4. The data card of claim 1 wherein said first strip comprises a direct-read-after-write, reflective, erasable strip having some pre-recorded programs or data thereon, and said second strip comprises a read-only optical memory.

* * * * *